(12) United States Patent
Simmons

(10) Patent No.: US 8,723,834 B2
(45) Date of Patent: May 13, 2014

(54) TOUCH SENSITIVE SCREEN CONFIGURATIONS

(75) Inventor: Martin J. Simmons, Southampton (GB)

(73) Assignee: Atmel Corporation, San Jose, CA (US)

(*) Notice: Subject to any disclaimer, the term of this patent is extended or adjusted under 35 U.S.C. 154(b) by 745 days.

(21) Appl. No.: 12/845,546

(22) Filed: Jul. 28, 2010

(65) Prior Publication Data

US 2012/0026122 A1    Feb. 2, 2012

(51) Int. Cl.
*G06F 3/045* (2006.01)
(52) U.S. Cl.
USPC .......................................................... 345/174
(58) Field of Classification Search
USPC ................... 345/173, 174; 178/18.05, 18.06
See application file for complete search history.

(56) References Cited

U.S. PATENT DOCUMENTS

| | | | |
|---|---|---|---|
| 5,606,346 A * | 2/1997 | Kai et al. .................... | 345/173 |
| 5,861,875 A * | 1/1999 | Gerpheide .................. | 345/174 |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 2008/0309635 A1 | 12/2008 | Matsuo | |
| 2009/0315854 A1 | 12/2009 | Matsuo | |
| 2011/0216017 A1* | 9/2011 | Chou et al. ................ | 345/173 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Allison W Johnson
(74) *Attorney, Agent, or Firm* — Baker Botts LLP

(57) ABSTRACT

Examples of arrangements of electrodes on a touch sensitive screen provide one or more advantages, such as reduced cross coupling, for example, when a person is using both thumbs or several fingers at substantially the same time to control the touch screen.

7 Claims, 5 Drawing Sheets

TOUCH SENSITIVE SCREEN CONFIGURATIONS

BACKGROUND

A position sensor is a device that can detect the presence and location of a touch, by a user's finger or by an object, such as a stylus, for example, within a display area of the position sensor overlaid on a display screen. In a touch sensitive display application, the position sensor enables a user to interact directly with what is displayed on the screen, rather than indirectly with a mouse or touchpad. Position sensors can be attached to or provided as part of computers, personal digital assistants (PDA), satellite navigation devices, mobile telephones, portable media players, portable game consoles, public information kiosks, and point of sale systems etc. Position sensors have also been used as control panels on various appliances.

There are a number of different types of position sensors/touch screens, such as resistive touch screens, surface acoustic wave touch screens, capacitive touch screens etc. A capacitive touch screen, for example, may include an insulator, coated with a transparent conductor in a particular pattern. When an object, such as a user's finger or a stylus, touches or is provided in close proximity to the surface of the screen there is a change in capacitance. This change in capacitance is sent to a controller for processing to determine the position of the touch on the screen.

In recent years, touch sensitive position sensors have been used in game consoles. Often a user of a game console uses both thumbs or several fingers at the same time to control the game. For example, FIG. 1 illustrates the positioning of a user's thumbs 10A, 10B at a touch screen. In the example of FIG. 1 both thumbs 10A, 10B are provided on the same Y line(s). In the application for a game console, it is very unusual for a user to position their thumbs at positions like 10A, 10B as illustrated in FIG. 2.

SUMMARY

The exemplary arrangements of electrodes on a touch sensitive screen provide one or more advantages, such as reduced cross coupling, for example, when a person is using both thumbs or several fingers at substantially the same time to control the touch screen.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

Figure 1:
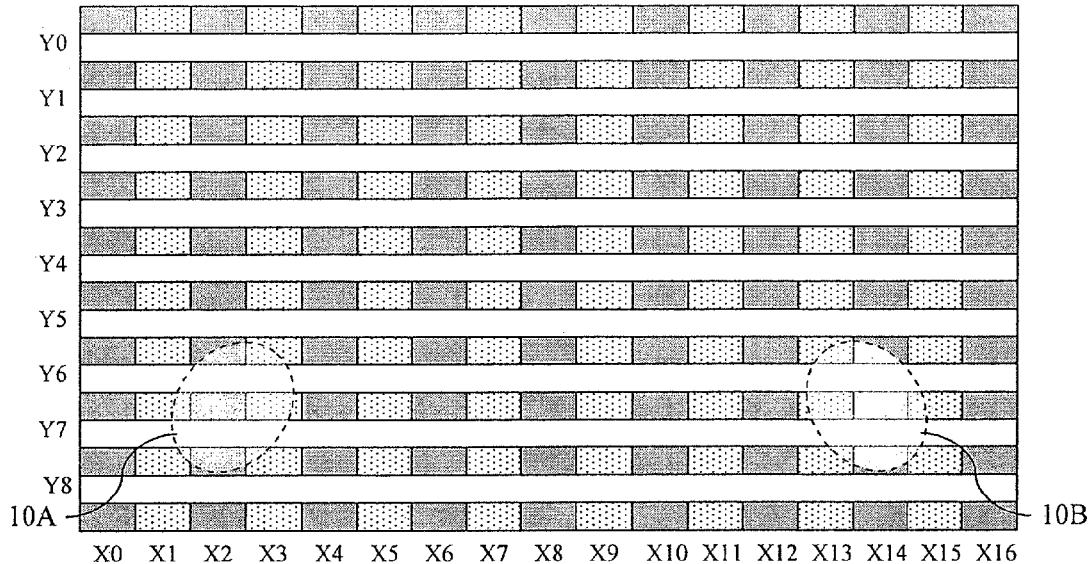
FIG. 1 illustrates schematically drive and sense electrodes for a touch sensitive screen.

In the following detailed description, numerous specific details are set forth by way of examples in order to illustrate the relevant teachings. In order to avoid unnecessarily obscuring aspects of the present teachings, those methods, procedures, components, and/or circuitry that are well-known to one of ordinary skill in the art have been described at a relatively high-level.

The examples shown and described implement a capacitive form of touch sensing. Although the electrode arrangements may be applicable to other types of capacitive touch sensing, the specific examples discussed below generally relate to mutual capacitance type touch sensitive screens. In a mutual capacitance sensing configuration, an array or grid of conductive drive electrodes or lines and conductive sense electrodes or lines can be used to form a touch screen having a plurality of capacitive sensing nodes. A node is formed at each intersection of drive and sense electrodes. Although referred to as an intersection, the electrodes cross but do not make electrical contact. Instead, the sense electrodes are capacitively coupled with the drive electrodes at the intersection nodes.

In a first example shown in the drawings, the sense electrodes of a touch sensitive screen are split at or near a center point, and a different order of connection to the sense channels is used for the sense electrodes on one side of the split from the order used for the sense electrodes on the other side of the split. Although not specifically shown, the drive electrodes of a touch sensitive screen may be similarly split at or near a center point, and a different order would then be used for the drive electrodes on one side of the split from the order used for the drive electrodes on the other side of the split. Instead of splitting and reordering electrodes, an alternative example uses a grid of drive and sense electrodes at an orientation that has been rotated about a perpendicular axis of a flat surface or substrate of the touch sensing screen. In this way, each of the drive electrodes is provided at a predetermined angle with respect to the elevational dimension of the screen, and each of the sense electrodes is provided at a predetermined angle with respect to the lateral dimension of the screen. In this later example, the controller is configured to supply drive signals to the drive channels, receive sense signals from the sense electrode channels, and to process the received sense signals to logically undo the rotated orientation of the sense electrodes to determine a position of a touch at the touch sensitive screen.

Reference now is made in detail to the examples illustrated in the accompanying figures and discussed below. FIG. 1 illustrates schematically a plurality of drive (X) electrodes and sense (Y) electrodes for a touch sensitive screen.

The X lines are provided on a separate layer relative to the Y lines. For example, in a mutual capacitance implementation, the X and Y electrodes are separated by at least one insulator. In the illustrated example, there is a bigger gap between the Y lines in order to enable the X field to come through between the adjacent Y lines. In an application where the touch screen is combined with a display to form a touch sensitive display device, the materials of the electrodes and the insulator would be transparent. For illustration purposes, the Y lines are shown as white rectangles, and alternating X lines are shown as alternating grey and spotty rectangles beneath the Y lines. In the illustrated X design, the X lines cover substantially all of the area of the touch screen, with only very small gaps (corresponding to lines in the drawing) between X electrodes, in order to prevent shorting of adjacent X lines.

In addition, FIG. 1 illustrates touches 10A, 10B from both of a user's thumbs at the screen at the same time. Typically, in mobile gaming applications, a user will have both thumbs present at the screen at the same time. In many instances, because of the way the touch screen is used in gaming applications, this results in both touches sharing a common drive electrode (X line in the exemplary orientation of FIG. 1) or a common sense electrode (Y line in the exemplary orientation of FIG. 1), depending on the orientation of the screen.

Figure 2:
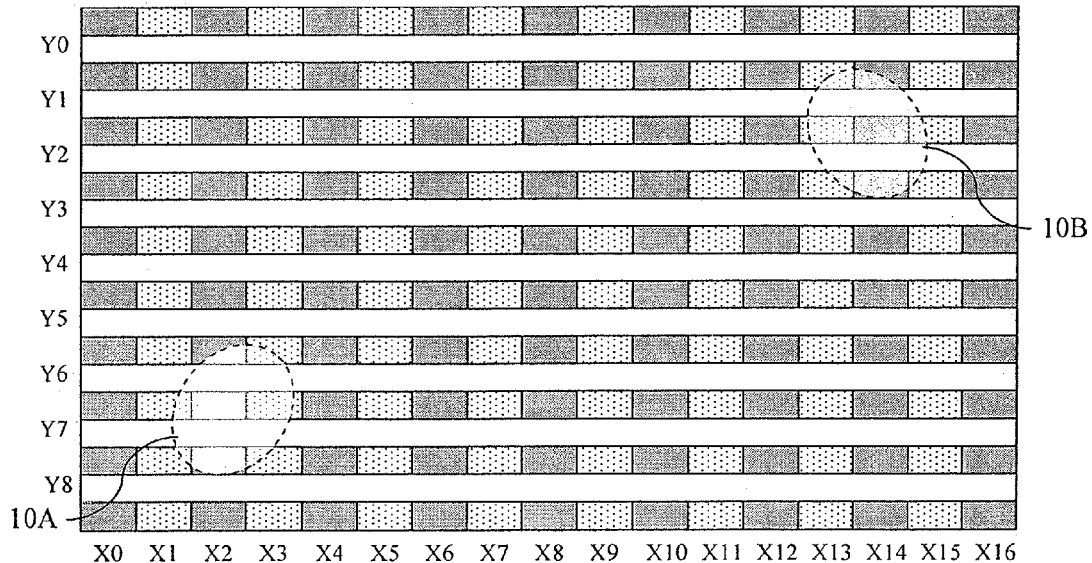
FIG. 2 illustrates schematically drive and sense electrodes for a touch sensitive screen.

FIG. 2 illustrates a plurality of drive and sense electrodes of a touch sensitive screen, where the user's touches 10A, 10B are not sharing any drive electrode or any sense electrode. This situation is less likely to occur, in gaming applications, since users tend to hold the devices at opposite sides or ends of the screen with their opposite thumbs at approximately the same elevation more like the example of FIG. 1.

When an object, such as a user's finger or a stylus, touches or is provided in close proximity to the surface of the screen there is a change in capacitance, and the change in capacitance is sensed and processed to determine the position of the touch on the screen. When a user touches the screen at two different points, for example, with different fingers or with the thumbs on opposite hands, some charge is picked up by one finger or thumb, transferred via the user's body and coupled back into the screen via the other finger or thumb. However, the sensed change in capacitance due to this charge transfer will be opposite in direction at the two different touches.

In the example of FIG. 1, since the two thumb touches 10A, 10B share one or more sense electrodes in common, cross coupling between the two touches 10A, 10B results. The drive electrode pulses are picked up by one thumb, transferred via the user's body and coupled back into the screen via the other thumb. This results in signal changes in the opposite direction with respect to the two concurrent touches. Similar cross coupling happens when there are two touches at the same time, even when the two touches are not sharing a drive or sense electrode, such as illustrated in FIG. 2. However, when the two touches are sharing a drive or sense electrode, such as illustrated shared sense (Y) electrodes as in the example of FIG. 1, the opposite signal changes will coincide with real touches and may cause positional errors in the touch detection.

In addition to cross coupling, the provision of the two thumbs 10A, 10B sharing a common drive or sense electrode may cause problems when attempting to deal with earth referenced noise. Earth referenced noise is injected by the touch, so limiting the touch to one per Y line reduces the noise that gets injected.

Figure 3:
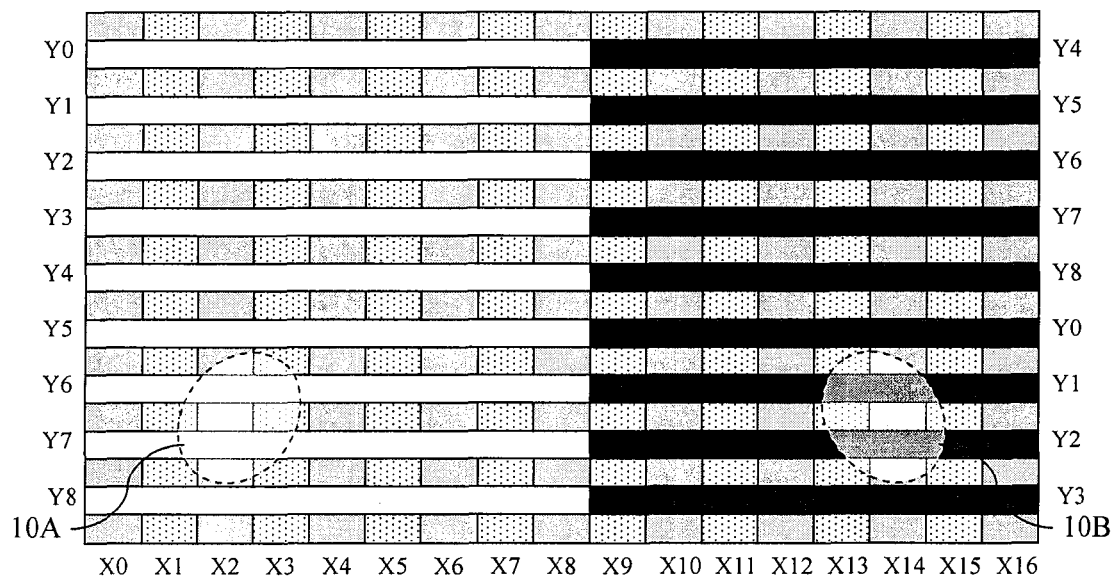
FIG. 3 illustrates schematically drive and sense electrodes for a first example of a touch sensitive screen.

The example of FIG. 3 illustrates schematically a plurality of drive and sense electrodes for a touch sensitive screen configured in a first exemplary manner so that the two thumb touches 10A, 10B do not share a common drive or sense electrode.

As illustrated in FIG. 3 the sense electrodes, shown as Y lines of in the example of FIG. 3, are split physically or electrically, near the center, into two sections as represented by the difference in Y line shading. The left side sense (Y) electrodes are connected to sense channels Y0 to Y8 of a control circuit discussed later, in the same order as in the touch screens of FIGS. 1 and 2, in top to bottom order Y0 to Y8. The right hand set of sense electrodes of FIG. 3, however, are connected to the same sense channels of the controller (illustrated in FIG. 5) but in a different order from the left hand set of sense electrodes. On the right side in this example, top to bottom, the sense electrodes are connected to the sense channels of the controller in the order Y4 to Y8 and then Y0 to Y3. For example, the Y line Y6 provided on the left hand side of FIG. 3 is connected to the same sense channel as the Y line Y6 provided on the right hand side of FIG. 3. However, the two Y6 lines are not provided at the same elevation on the touch sensitive screen. The different order can be chosen so that it is unlikely that the same Y line is touched at the same time by both fingers/thumbs during normal use of the touch sensitive screen. This reordering of the Y lines, for example, results in reduced cross coupling when the touch sensitive screen is used in gaming applications.

In the example, since the split is in the middle of the screen in the lateral dimension, one half of the X electrodes are associated which each half section of the Y electrodes. As illustrated, X electrodes X0 to X8 are in the left hand section of the touch screen to form capacitive sensing nodes where the Y electrodes Y0 to Y8 cross over that set of the sense electrodes (separated by an insulator). As illustrated, X electrodes X9 to X16 are in the right hand section of the touch screen to form capacitive sensing nodes where the re-ordered Y electrodes Y4 to Y8, Y0 to Y3 cross over that set of the sense electrodes (separated by the insulator).

With reference to FIG. 3, when a drive signal is applied to X line X2, and the user touches the screen with her or his thumbs at the positions 10A and 10B simultaneously, a sense signal will be detected on Y lines Y6 and Y7. However, at a different timing, when a drive signal is applied to X line X14, the concurrent touches 10A and 10B result in detection of a sense signal on Y lines Y1 and Y2, since the Y lines on the right hand side of FIG. 3 are provided in a different order from the Y lines on the left hand side of FIG. 3. The sensed data from Y lines Y1 and Y2 is then corrected, for example, by logical reordering, such that the elevation of the touch 10B detected on the right hand side of FIG. 3 is at approximately the same elevation as the touch 10A detected on the left hand side of FIG. 3, although the touches 10A and 10B will be detected at the respective lateral (x) locations based on timing of the drive signals applied to X lines X2 and X14 when each touch was detected.

The correction or reordering of the sensed Y line signals can be implemented by software/firmware programming of a processor, for example, to enable the processor to digitally reorder the sense channel signals into the correct order, for example, analogous to signals from Y lines Y0 to Y8 illustrated in FIG. 1, so the correct position of each touch is indicated. The programming knows the connections and corrects the position determination of the touch for the difference in order in the two sections of the screen and the X electrodes and associated drive signal timing for each section. For example, in FIG. 3, a sensed signal from the right hand sense electrode Y4 is corrected to Y0, a sensed signal from the right hand sense electrode Y5 is corrected to Y1, a sensed signal from the right hand sense electrode Y6 is corrected to Y2, etc. Therefore, it is determined that the left hand touch 10A has a position spanning Y6 and Y7, and the right hand touch 10B has a position spanning Y1 and Y2 corrected to Y6 and Y7.

Figure 4:
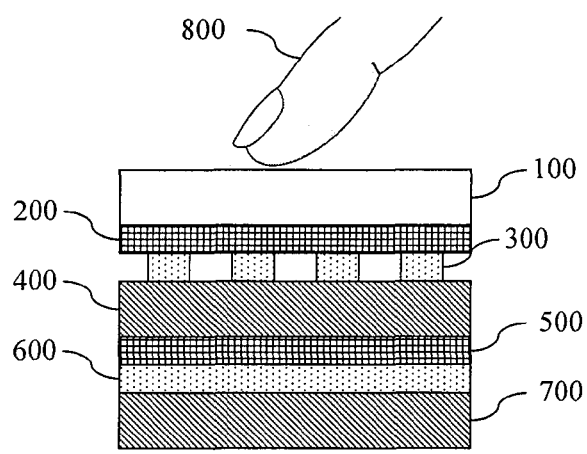
FIG. 4 illustrates schematically a side view of a touch sensitive screen.

FIG. 4 illustrates a side or section view of a portion of an exemplary touch sensitive screen, although not drawn at the same scale as the screens in FIGS. 1 to 3. The touch sensitive screen of FIG. 4 is made up of a transparent panel 100, a first adhesive layer 200, a light transmissive conductive electrode layer 300, a first insulating substrate 400, a second adhesive layer 500, a second light transmissive conductive electrode layer 600, and a second insulating substrate 700.

The first conductive electrode layer 300 includes a plurality of first electrodes, and the second conductive electrode layer 600 includes a plurality of second electrodes. In the example, the first electrodes formed in layer 300 are sense electrodes similar to the Y electrodes in the earlier drawings; and the second electrodes formed in layer 600 are drive electrodes similar to the X electrodes in the earlier drawings. A plurality of nodes are formed at the intersections of the first electrodes and the second electrodes. The first and second electrodes can be configured to form any particular pattern as desired, including the patterns shown in the earlier drawings. In FIG. 4, the second electrodes are arranged perpendicular to the first electrodes such that only the side of one of the second electrodes is visible in the side view. In one example, the transparent panel 100 is made of a resilient, transparent material suitable for repeated touching, such as Polycarbonate or PMMA (poly(methyl methacrylate)). The first and second adhesive layers 200, 500, for example, may be made of any optically clear adhesive suitable for use in a touch panel. By way of example, the first and second substrates 400, 700 are transparent materials, such as PET (polyethylene terephthalate), Polycarbonate, or glass. Examples of transparent conductive materials for the first and second conductive electrode layers 300, 600 include PEDOT (Poly(3,4-ethylenedioxythiophene)) and ITO (indium tin oxide). In the example of FIG. 4, the first and second conductive electrode layers 300, 600 are provided on two substrates 400, 700, although the present discussion encompasses examples in which the first and second conductive electrode layers 300, 600 are provided on the same substrate.

In an application with a display, the touch screen of FIG. 4 would be mounted over the exterior of the display device, for example, with the substrate 700 adjacent to the display device (not shown). The display may be of any type known to the skilled person, such as a liquid crystal display (for example, an active matrix liquid crystal display), an electroluminescent display, an electrophoretic display, a plasma display, or a cathode-ray display. By way of example, in the illustrated orientation, the substrate 700 would be on top of the output surface of the display device. It will be appreciated that light emitted from the display is intended to pass through the position sensing panel in order to be visible to a user. Therefore, elements of the layer stack in the aggregate are substantially transparent. Light produced or reflected from the display device, representing displayed information, passes through the elements of the layer stack (upward in the exemplary orientation) for observation of the information by a user. The user may touch the panel 100, as shown at 800, to provide input such as to select from the information shown on the display.

Figure 5:
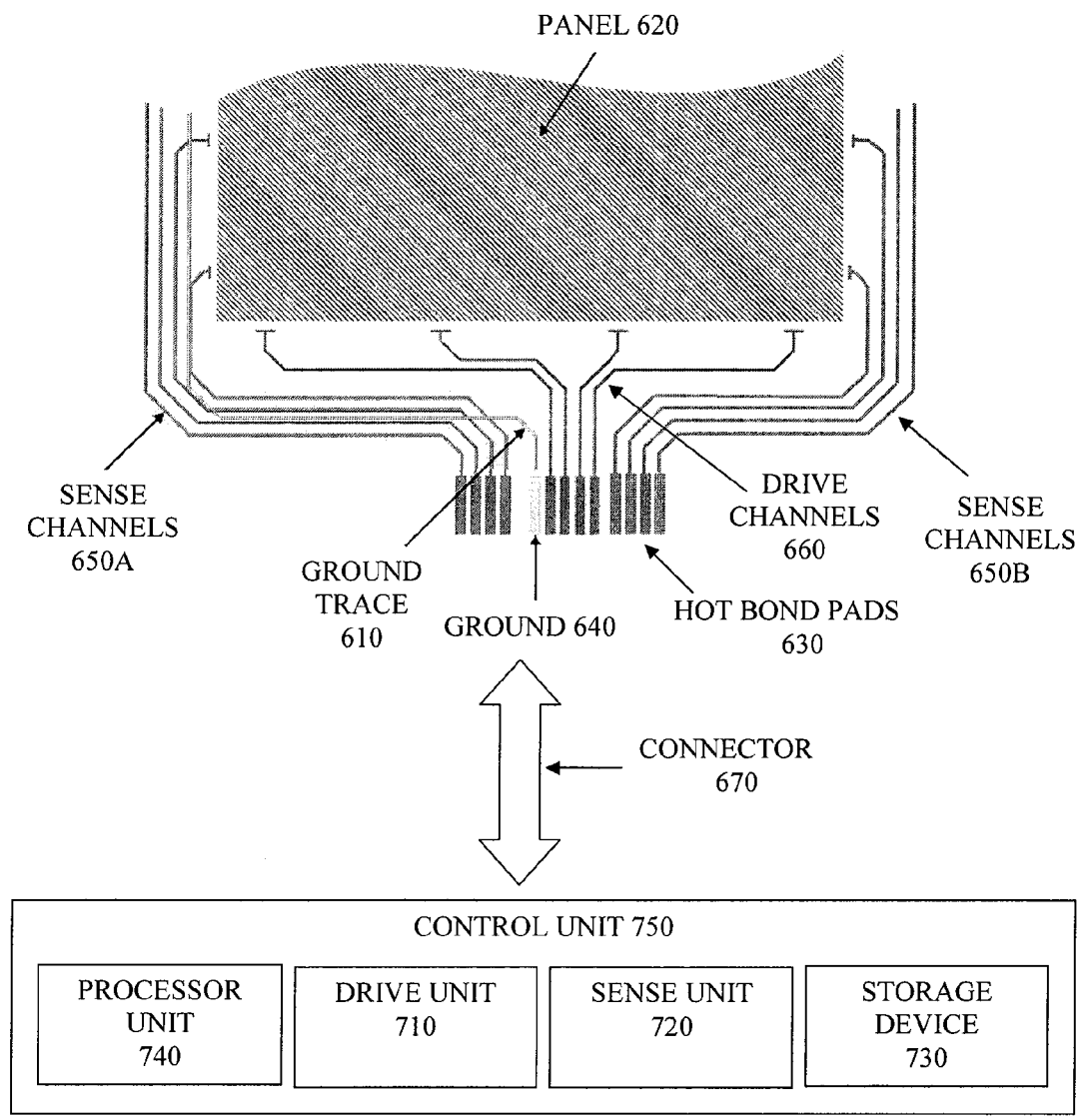
FIG. 5 illustrates schematically channel connections and electronics for detecting and processing a touch at a touch sensitive screen of the type shown in FIG. 3.

A panel of drive and sense electrodes, as illustrated in FIGS. 3 and 4 is supported by associated electronics that determine the location of the various touches. FIG. 5 illustrates schematically drive and sense channel connections and the electronics for detecting and processing a touch at a touch sensitive screen 620. Although not shown in detail in FIG. 5, we will assume an electrode configuration like that of FIG. 3, for purposes of further discussion here. In this example, the drive electrodes of the touch screen 620 connect to drive channels 660, and the sense electrodes of the touch screen 620 connect to sense channels 650A, 650B. The sense channels 650A are connected to the sense electrodes provided at the left hand side of the touch screen 620, and the sense channels 650B are connected to the plurality of sense electrodes provided at the right hand side of the touch screen 620. The drive and sense channels 650A, 650B, 660 are connected to a control unit 750 via a connector 670. The wiring traces also include a ground trace 610 having an associated ground connector 640. In the example, the traces forming the channels have hot bond pads 630, to facilitate electrical connection via the connector 670. Although shown as separate sense channel connections 650A, 650B, for convenience, the wiring and/or connector would connect both sections of the split sense electrodes to the same Y0 to Y8 inputs of the sense unit 720, but in the two different orders as discussed above relative to FIG. 3.

The control unit 750 may be provided as a single integrated circuit chip such as a general purpose microprocessor, a microcontroller, a programmable logic device/array, an application-specific integrated circuit (ASIC), or a combination thereof. In the illustrated example the control unit 750 includes a drive unit 710, a sense unit 720, a storage device 730 and a processor unit 740. The hardware of the control unit 750 may be similar to that used to detect touch at a touch screen of the type shown in FIGS. 1 and 2; although the logic, implemented by programming the processor 740 in the example, is adapted to handle the different order of the connections to the split sections of the sense electrodes.

The processor unit 740 is capable of processing data from the sense unit 720 and determining a position of a touch, including by reordering the signals from the right hand set of the split sense electrodes as outlined above, so that the correct position of the touch is determined. In an implementation where the processor unit 740 is a programmable device, the programming for reordering of the signals from the split sense electrodes may reside in the storage device 730. In another example, the drive unit 710, sense unit 720 and processor unit 740 may all be provided in separate control units.

Figure 6:
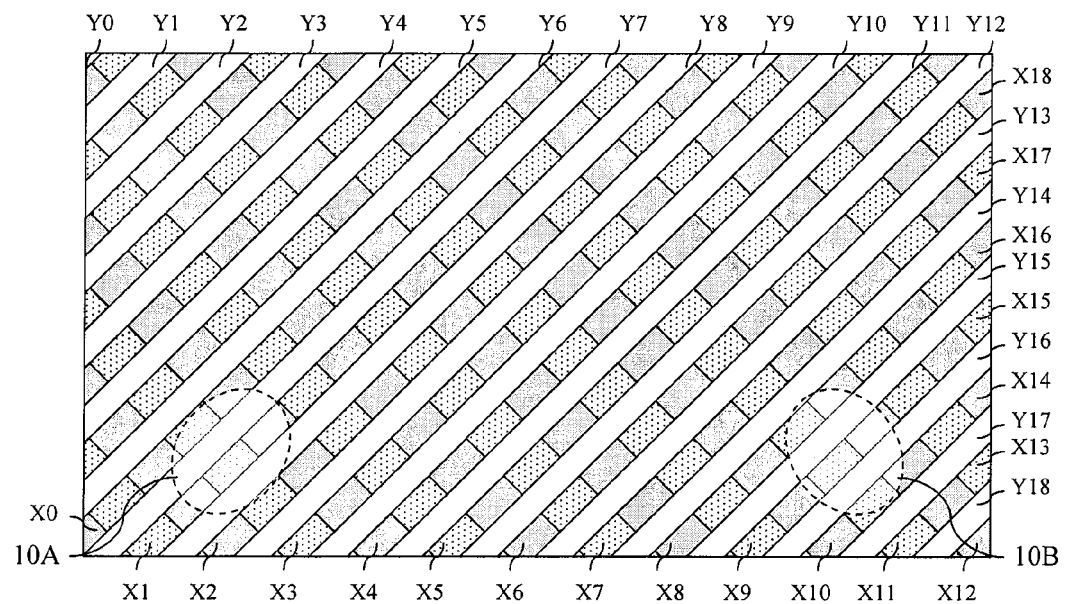
FIG. 6 illustrates schematically drive and sense electrodes for another example of a touch sensitive screen.

FIG. 6 illustrates schematically another exemplary arrangement of drive and sense electrodes for a touch sensitive screen. In FIG. 6 the drive and sense electrodes have been rotated by 45 degrees relative to the lateral and elevational dimensions of the exemplary rectangular screen. Therefore, when the user's places their thumbs or fingers on the touch screen, even though the touches 10A, 10B from both of a user's thumbs at the screen are level/provided at approximately the same elevation, the user's thumbs/touches 10A, 10B are not provided on the same sense electrodes. Thumb touch 10A is provided at sense electrodes Y7 and Y8 and thumb touch 10B is provided at sense electrodes Y15 and Y16. The position of the touches can then be determined by software, for example, by applying mathematical formulae as if to logically rotate the X and Y lines into their correct orientation, as illustrated in FIG. 1.

Although FIG. 6 illustrates rotating the drive and sense electrodes by 45 degrees, the drive and sense electrodes can be rotated by any angle desired.

In an arrangement like that of FIGS. 1 and 2, the intersections of the X and Y lines correspond to x and y coordinates on the screen, in the lateral and elevational dimensions of the exemplary rectangular screens. In the arrangement of FIG. 3, the intersections of the X and Y lines still correspond to x and y coordinates on the screen, although the Y line connection order is different in the different sections, therefore the control units will provide a correction for the order during processing with respect to touches sensed on the right side of the screen, essentially to correct the y coordinate. In the arrangement of FIG. 6, however, the inputs the connections to the X and Y lines are similar to earlier examples, such as FIGS. 1 and 2; but the locations of the intersections do not correspond to x and y coordinates in the lateral and elevational axes or dimensions of the rectangular screen.

The arrangement of FIG. 6 requires more X and Y lines than the arrangement of FIG. 3 as a result of the rotated orientation of the electrodes. In addition, the corrections required are more complicated for the arrangement of FIG. 6 when compared to those required for the arrangement of FIG. 3, in that the electronics will compensate for the rotated electrode pattern to generate x, y coordinates of detected outputs, e.g. for output to higher level logic of the device that incorporates the touch sensitive screen.

Figure 7:
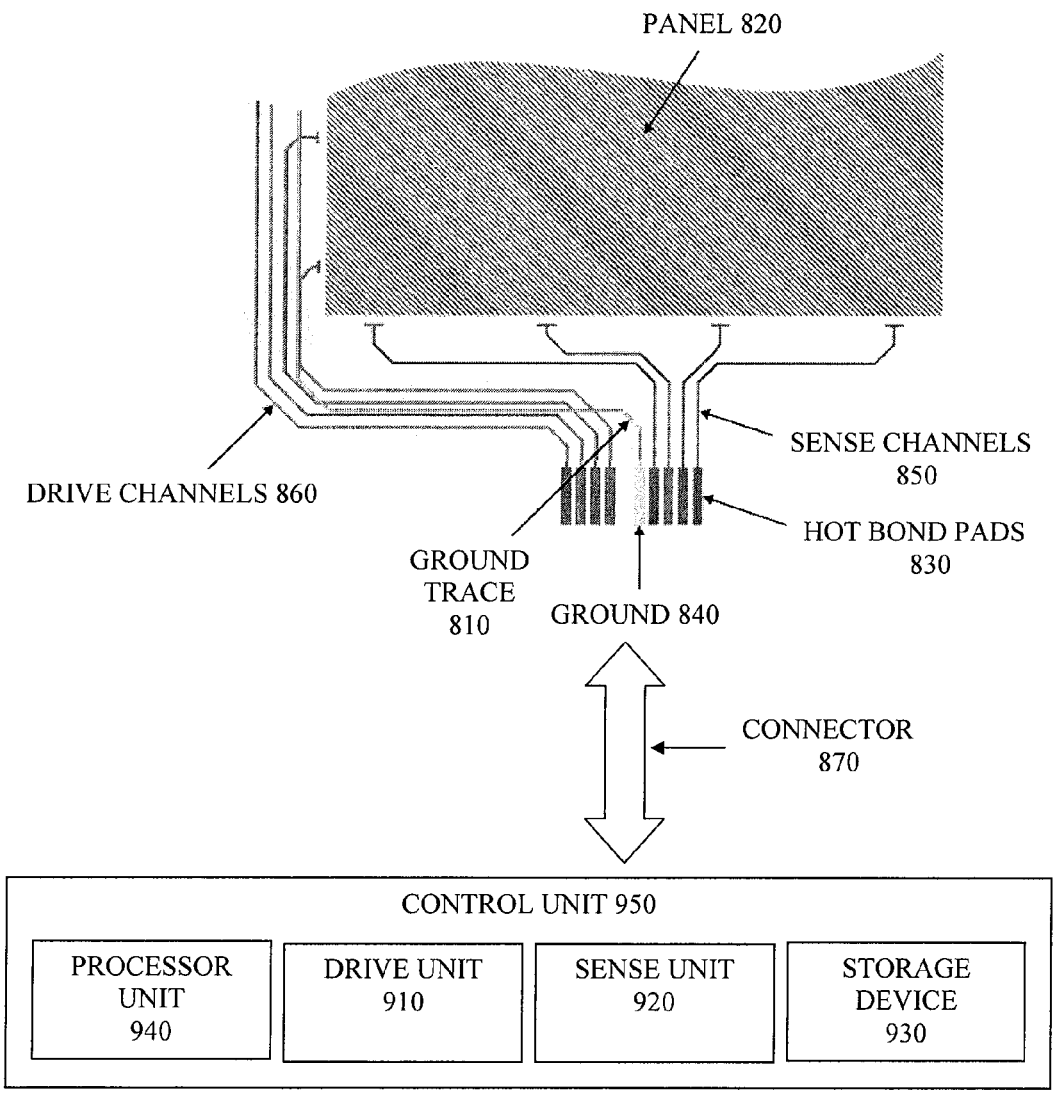
FIG. 7 illustrates schematically channel connections and electronics for detecting and processing a touch at a touch sensitive screen of the type shown in FIG. 6.

As in the earlier examples, the panel of drive and sense electrodes of FIG. 6 is supported by associated drive and sense channel connections and electronics that determine the location of the various touches at a touch sensitive screen. Although not shown in detail in FIG. 7, we will assume an electrode configuration like that of FIG. 6, for purposes of further discussion here. In general, the connection wiring the hardware of the elements of the control unit 950 are similar to those for the earlier examples of FIGS. 1 and 2, except that there are more connections and more inputs/outputs, to correspond to the numbers of X drive electrodes and Y sense electrodes in the panel of FIG. 6 and the drive and sense channel connections may be connected at somewhat different locations (not all shown) around the screen 820 to connect to the particular electrodes.

In this example, the drive electrodes of the touch screen 820 connect to drive channels 860, and the sense electrodes connect to sense channels 850. The drive and sense channels 860, 850 are connected to a control unit 950 via a connector 870. The wiring traces also include a ground trace 810 having an associated ground connector 840. In the example, the traces forming the channels have hot bond pads 830, to facilitate electrical connection via the connector 870.

As in the earlier example of the electronics, the control unit 950 may be provided as a single integrated circuit chip such as a general purpose microprocessor, a microcontroller, a programmable logic device/array, an application-specific integrated circuit (ASIC), or a combination thereof. In the illustrated example the control unit 950 includes a drive unit 910, a sense unit 920, a storage device 930 and a processor unit 940. The processor unit 940 is capable of processing data from the sense unit 920 and determining a position of a touch, including for compensating for the rotated orientation of the electrodes, so that the correct position of the touch is determined. In an implementation where the processor unit 940 is a programmable device, the programming for processing the signals from the sense electrodes may reside in the storage device 930. In another example, the drive unit 910, sense unit 920 and processor unit 940 may all be provided in separate control units.

The x, y coordinates of nodes where touches are sensed on the screen of FIG. 6, analogous to the node positions of the screen orientation of FIGS. 1 and 2, are determined by processor execution of the programming from storage. The programming may, for example, implement a mathematical formulae to effectively undo the rotated orientation of the drive and sense lines, to produce coordinates for a their correct x, y position on the touch screen, corresponding to the node positions of the grid illustrated in FIG. 1. Since there are a finite number of capacitive sensing nodes on the screen, even with the configuration of FIG. 6, an alternative approach might use a look-up table in storage to allow the processor to convert the determination touch at each X, Y node of the screen of FIG. 6 with the rotated electrodes into the correct x, y coordinates.

Various modifications may be made to the examples and embodiments described in the foregoing, and any related teachings may be applied in numerous applications, only some of which have been described herein. It is intended by the following claims to claim any and all applications, modifications and variations that fall within the true scope of the present teachings.

The invention claimed is:

1. A touch sensitive screen comprising:
at least one insulator;
first and second pluralities of electrodes separated by the at least one insulator, the plurality of first electrodes bring arranged in a first direction, and the plurality of second electrodes being arranged in a second direction different from the first direction such that the first and second electrodes cross over each other to form touch sensing nodes;
a controller configured to supply signals to and receive signals from electrodes;
a first plurality of channels connecting the first electrodes to the controller;
a second plurality of channels connecting the second electrodes to the controller, wherein:
each of the second electrodes comprises a first section and a second section, the first section being collinear with, and electrically insulated from, the second section,
wherein the first section of each second electrode is connected to a first one of the plurality of the second channels and the second section of each second electrode is connected to a second one of the plurality of second channels that is different from the first one of the plurality of second channels,
wherein the controller is further configured to compensate for the first section of each second electrode being connected to a different one of the plurality of second channels than the second section of each second electrode when determining a position of a touch at the touch sensitive screen by reordering signals from the second electrodes by associating each second one of the plurality of second channels with a respective first one of the plurality of second channels, each associated first one and second one of the plurality of the second channels connected to a respective first section and second section having the same distance from an edge of the touch sensitive area.

2. The touch sensitive screen of claim 1, wherein:
the first electrodes are drive electrodes and the first channels are drive channels, and
the second electrodes are sense electrodes and the second channels are sense channels.

3. The touch sensitive screen of claim 2, wherein the controller comprises:
a drive unit configured to apply drive signals to the drive electrodes via the drive channels;
a sense unit configured to sense signals from the sense electrodes via the sense channels; and
a processor configured to control the drive unit and responsive to sensing by the sense unit, to compensate for the different orders of connections and determine the position of the touch at the touch sensitive screen.

4. The touch sensitive screen of claim 3, further comprising:
a storage device accessible by the processor; and
programming in the storage device, which configures the processor to compensate for the different orders of connections.

5. A touch sensitive screen comprising:
a plurality of drive electrodes provided on the at least one substrate, each drive electrode connected to a drive channel;

and a plurality of sense electrodes provided on the at least one substrate, wherein:

a plurality of capacitive sensing nodes are formed at intersections of the drive electrodes and the sense electrodes, each sense electrode comprises a first electrode and a second electrode, the first electrode being collinear with, and electrically insulated from, the second electrode wherein the first electrode of each sense electrode is connected to a first of a plurality of sense channels and the second electrode of each sense electrode is connected to a second of the plurality of sense channels that is different from the first of the plurality of sense channels; and a controller configured to supply drive signals to the drive channels, receive sense signals from the first and second sense channels, to compensate for the first electrode of each sense electrode being connected to a different one of the sense channels than the second electrode of each second electrode, and to determine a position of a touch at the touch sensitive screen by reordering signals from the second electrodes by associating each second one of the plurality of sense channels with a respective first one of the plurality of sense channels, each associated first and second of the plurality of the sense channels connected to a respective first electrode and second electrode having the same distance from an edge of the touch sensitive area.

6. The touch sensitive screen of claim 5, wherein:

each sense electrode comprises a first end provided at the first electrode and connected to the first sense channel, and a second end provided at the second electrode and connected to the second sense channel, and the first electrode and the second electrode of each sense electrode are separated from each other.

7. The touch sensitive screen of claim 6, wherein the controller comprises:

a programmable processor;

a storage device accessible by the processor; and programming in the storage device, which configures the processor to compensate for the different orders of connections.

* * * * *

UNITED STATES PATENT AND TRADEMARK OFFICE
CERTIFICATE OF CORRECTION

PATENT NO. : 8,723,834 B2  
APPLICATION NO. : 12/845546  
DATED : May 13, 2014  
INVENTOR(S) : Martin J. Simmons Page 1 of 1

It is certified that error appears in the above-identified patent and that said Letters Patent is hereby corrected as shown below:

In the Claims

Column 8, Line 9: After "the plurality of first electrodes" delete "bring" and insert -- being --.

Signed and Sealed this
First Day of September, 2015

Michelle K. Lee
*Director of the United States Patent and Trademark Office*